US008482525B2

(12) United States Patent
Moore

(10) Patent No.: US 8,482,525 B2
(45) Date of Patent: Jul. 9, 2013

(54) KNEE OPERATED COMPUTER MOUSE

(75) Inventor: Robby J. Moore, Chicago, IL (US)

(73) Assignee: Robby Moore, Steger, IL (US)

( * ) Notice: Subject to any disclaimer, the term of this patent is extended or adjusted under 35 U.S.C. 154(b) by 479 days.

(21) Appl. No.: 12/586,908

(22) Filed: Sep. 30, 2009

(65) Prior Publication Data

US 2011/0074680 A1 Mar. 31, 2011

(51) Int. Cl.
*G09G 5/08* (2006.01)
(52) U.S. Cl.
USPC .......................................................... 345/163
(58) Field of Classification Search
USPC ................. 345/163, 156, 157, 164, 166, 167, 345/158; 400/475
See application file for complete search history.

(56) References Cited

U.S. PATENT DOCUMENTS

| | | | |
|---|---|---|---|
| 5,367,631 A * | 11/1994 | Levy | 345/163 |
| 5,841,426 A | 11/1998 | Dodson | |
| 5,886,685 A * | 3/1999 | Best | 345/163 |
| 6,154,199 A | 11/2000 | Butler | |
| 6,262,715 B1 | 7/2001 | Sawyer | |
| 6,850,224 B2 | 2/2005 | Baughman | |
| 6,975,303 B2 * | 12/2005 | Dalsey | 345/163 |
| 2003/0071787 A1 * | 4/2003 | Gerstacker | 345/163 |
| 2004/0112151 A1 * | 6/2004 | Maxwell et al. | 73/865.4 |
| 2006/0274045 A1 * | 12/2006 | Stenbroten | 345/168 |
| 2007/0069096 A1 * | 3/2007 | VonHeck | 248/346.01 |
| 2007/0084976 A1 * | 4/2007 | Bate et al. | 248/118 |
| 2010/0039381 A1 * | 2/2010 | Cretella et al. | 345/158 |

FOREIGN PATENT DOCUMENTS

JP 62-37731 * 2/1987

* cited by examiner

*Primary Examiner* — Nabil Hindi

(57) ABSTRACT

The present invention teaches an improved method of controlling a cursor on a computer screen, without using the hand, by strapping the mouse around the patella section of the leg with a patella strap and utilizing leg muscle movement, while sitting down, to control the direction of the cursor. After manipulating the cursor by using body movement and keeping both hands on the keyboard, the programmable function keys or another hands free or appendage attached push button, motion, or voice device are used to execute a command. By eliminating the need of hand movement to move the cursor, the user is helped to prevent the development of carpal tunnel, DeQuervains tendonitis, debilitating muscle cramps, fatigue and other repeated motion related conditions.

19 Claims, 4 Drawing Sheets

KNEE OPERATED COMPUTER MOUSE

FIELD OF THE INVENTION

The present invention relates to cursor manipulation devices. More particularly, the present invention relates to hands free cursor manipulation devices.

BACKGROUND OF THE INVENTION

A computer mouse is designed to control the movement of a computer's cursor, which is a marker that points to a specific location on a computer's screen, enabling the user to access different functions within the computer. There are different methods used to connect the mouse to a computer: a cord or wire to connect from the mouse to a computer's PS/2 port or a cordless mouse, which is not physically connected to the computer, but instead uses infrared or radio waves to transmit signals to the computer.

The shortcoming of using a typical computer mouse is they are generally positioned on a user's desk top or workstation. This requires the user to continuously use one hand to operate the computer's mouse in order to control the cursor on the computer screen. Mouse manipulation requires the user to: grasp the mouse; move the arm and wrist to position the mouse, as needed, to perform a scrolling function or to activate the buttons. Because of the amount of movement required from the arm, wrist and fingers to control a conventional computer mouse, conditions, such as, carpel tunnel syndrome and tendonitis can occur from repetitive use.

Reports on the growing number of people experiencing carpal tunnel from the continuous use of a hand operated desk top mouse is prevalent in today's computerized world. One practical solution is the use of hands free devices to control a mouse cursor on a computer screen. Various attempts have been made to address the foregoing problem of carpel tunnel and other conditions resulting from the continuous use of a hand operated desk top computer mouse. For example, one prior art approach is disclosed in U.S. Pat. No. 5,841,426, as a foot operated computer mouse for controlling a computer, providing similar functions as a conventional hand operated mouse. This device is large and bulky, in order to accommodate the varying sizes of a foot to operate the cursor, therefore, would be useless and impractical in tight confined work areas.

Another example is U.S. Pat. No. 6,262,715B1, for an "ergonomic computer mouse." This invention discloses a mouse that provides comfort for the user by maintaining the user's hand at an acute angle to the horizontal.

This invention requires the user to move an arm and wrist away from the computer keyboard to locate and grasp the disclosed mouse, therefore, preoccupying the user's hand and use of arm, wrist and finger muscles. U.S. Pat. No. 6,154,199 discloses a glove-like article that contains a tracking ball on the side of the index finger for manipulation by the user's thumb, with mouse buttons located on the palm of the glove-like article, which are controlled by the user's fingers. U.S. Pat. No. 6,850,224 discloses a "wearable ergonomic computer mouse," designed to be worn on the hand of a computer user. Flexible adjustment straps are used to attach an electronic base to the user's hand, for transmitting electrical signals to the computer system. Both of these inventions require the use of a user's fingers or hand to either position the cursor or to operate the mouse buttons, which may cause injuries and muscle strains from repetitive movement. In addition, one of the user's hands is required to operate the movement of the computer's cursor.

Therefore, there remains a need for an improved method to operate a computer mouse effectively, hands-free, while eliminating the repetitive strain on the user's arm, wrist and fingers that may cause carpel tunnel syndrome, tendonitis, or muscle pain and cramping.

SUMMARY OF THE INVENTION

A knee operated computer mouse is strapped and worn around the user's patella, below the knee, or any section of the leg, to control the movement and direction of one or multiple cursors on a computer screen, without the use of a hand, by utilizing leg muscle movement while sitting down, thus preventing the development of carpal tunnel syndrome, DeQuervains tendonitis and other conditions.

Powered by plugging into a USB port, alternative power may also be used, such as, a rechargeable battery source contained within the mouse component compartment. The user can control multiple functions on the computer screen with the use of mouse software. The mouse software enables the user to see a display of the accelerometer's functions to enable the user to personalize and navigate the cursor precisely. The mouse software can be upgraded to enable the user to control one or more cursors on multiple computer screens simultaneously, whether the user is wearing one knee operated computer mouse on the right patella, or is also wearing an additional knee operated computer mouse on the left patella to provide independent control of multiple cursors. To execute a command that the cursor is on/over, the user presses the programmable function keys on the keyboard, or another hands free or appendage attached push button, motion, or voice activated device.

A connector, which can be a cord, infrared light, USB or Bluetooth, is contained within the mouse component compartment, and allows the computer to read the information the mouse transmits to the computer. The mouse component is attached to a patella strap, which wraps securely around the patella section of the leg, just below the knee, to support the mouse component to the leg. A tilting scroll wheel is contained within the mouse component compartment to enable the mouse to control the directional functions of the mouse cursor on a desk top when detached from the patella strap.

The accelerometer is contained within the mouse component compartment and acts with a gyroscope, enabling the user to manipulate the cursor on the computer screen by using leg motion, which transmits a signal to a receiver plugged into a USB port. An encoder chip is contained within the mouse component compartment to convert movement into digital signals. A function LED button, contained within the mouse component compartment allows the mouse's software to be upgraded, reset, and to program the keyboard's function keys.

To resolve the drawbacks associated with the prior art, it is an object of the present invention to provide computer users with an improved, hands free computer mouse device that enables the user to control a cursor and movement on a computer screen, without using the hand, by strapping the mouse around the patella section of the leg with a patella strap and utilizing leg muscle movement, while sitting down, to control the direction of the cursor. Selection and execution of the mouse commands are completed by pressing the programmable function keys on the keyboard of the user so that the user never has to remove their hands from the keyboard.

It is another object of the present invention to provide a knee operated computer mouse with software to enable the user to control multiple functions on the computer screen and see all information displayed, including the accelerometer's functions, to enable the user to navigate the cursor precisely on the computer screen before executing commands using programmable function keys on the keyboard.

It is a further object of the present invention to provide a knee operated mouse that attaches to a patella strap, which wraps securely around the patella section of the leg, just below the knee, to support the mouse component to the leg.

It is still a further object of the present invention to provide a knee operated computer mouse with a tilting scroll wheel to enable the mouse to control the directional functions of the mouse cursor on a desk top when detached from the patella strap. A still further object of the present invention is to provide a knee operated mouse that helps prevent the development of carpal tunnel, muscle cramps, DeQuervains tendonitis and other conditions.

These and additional objects of the present inventions may be determined from a review of the instant disclosure, disclosing a knee operated computer mouse for controlling a cursor and movement on a computer screen, without using the hand, by strapping the mouse around the patella section of the leg with a patella strap and utilizing leg muscle movement, while sitting down, to control the direction of the cursor. Once the cursor is over the desired selection, execution of the mouse commands are completed by pressing the programmable function keys on the keyboard of the user. The knee operated mouse is powered by plugging into a USB port, or using alternative power, such as, a rechargeable battery source, being contained within the mouse component compartment.

Other objects, advantages and features of the present invention will become apparent upon a consideration of the following detailed description, when taken in conjunction with the accompanying drawings. The brief description sets forth broadly, the more important features of the present disclosure so that the detailed description that follows may be better understood, and so that the present contributions to the art may be better appreciated.

DETAILED DESCRIPTION OF THE PREFERRED EMBODIMENT

The following is a description of the best mode presently contemplated for carrying out the invention. Other modes of carrying out the invention, without departing from the scope of the invention, will become apparent to those skilled in the art as the description proceeds.

Figure 1:
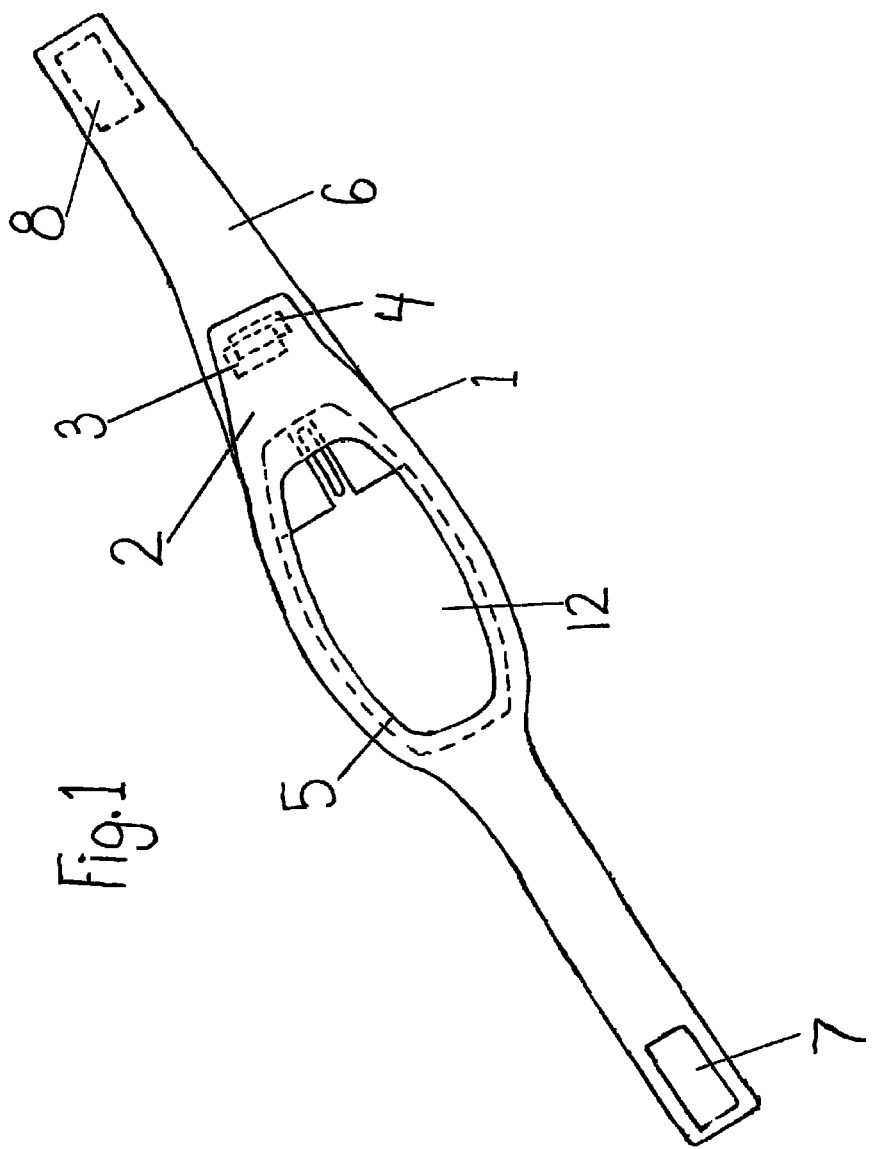
FIG. 1 is a top view of the knee operated computer mouse of the present invention, more particularly with the mouse attached and supported onto the patella strap with a mouse harness strap.
Figure 2:
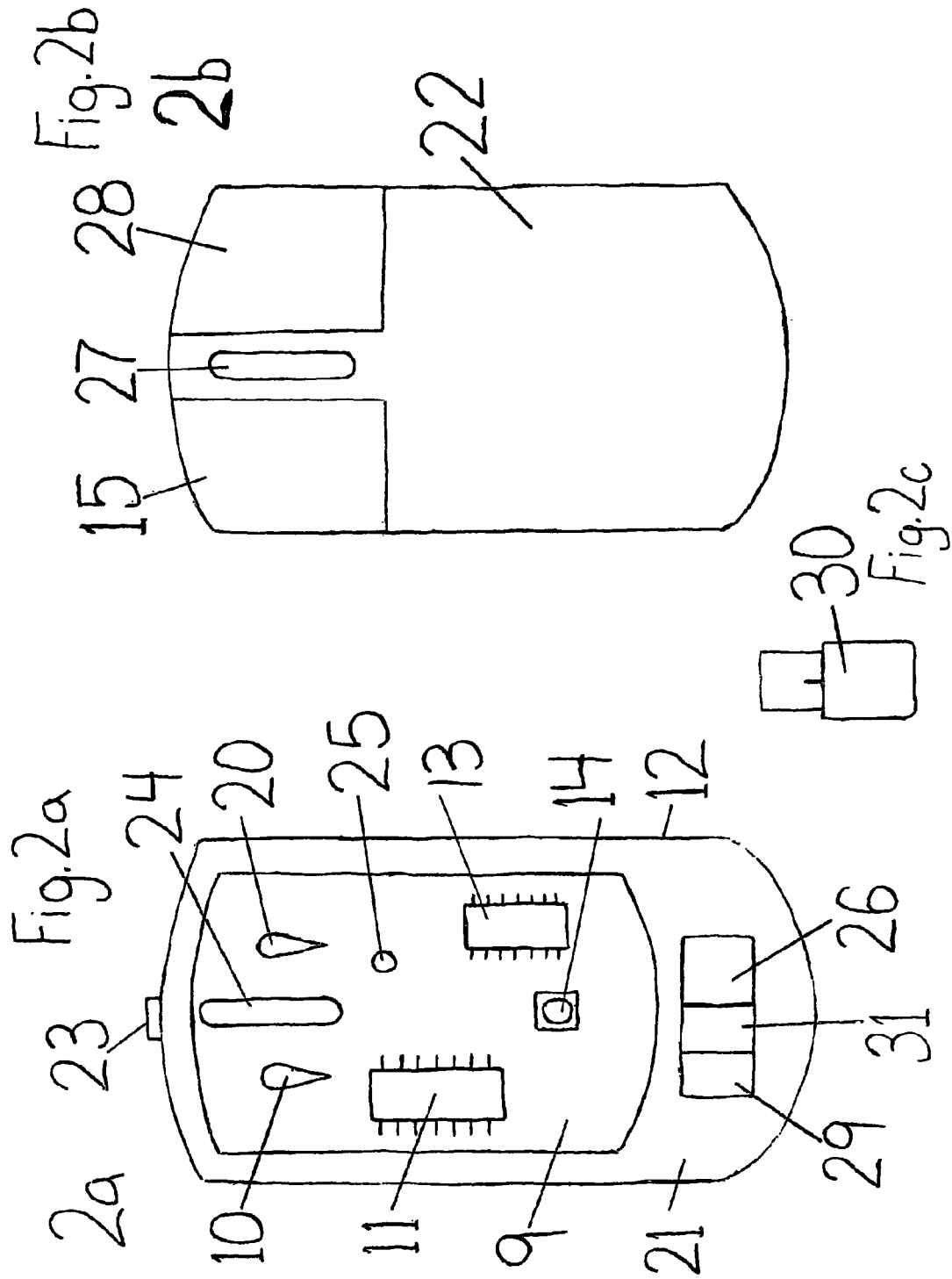
FIG. 2a is a top interior view of the knee operated computer mouse of the present invention, more particularly showing the interior components attached inside the bottom shell of the mouse.
FIG. 2b is a top view of the upper shell of the mouse.
FIG. 2c is a top view of the USB receiver for connection with the computer.
Figure 3:
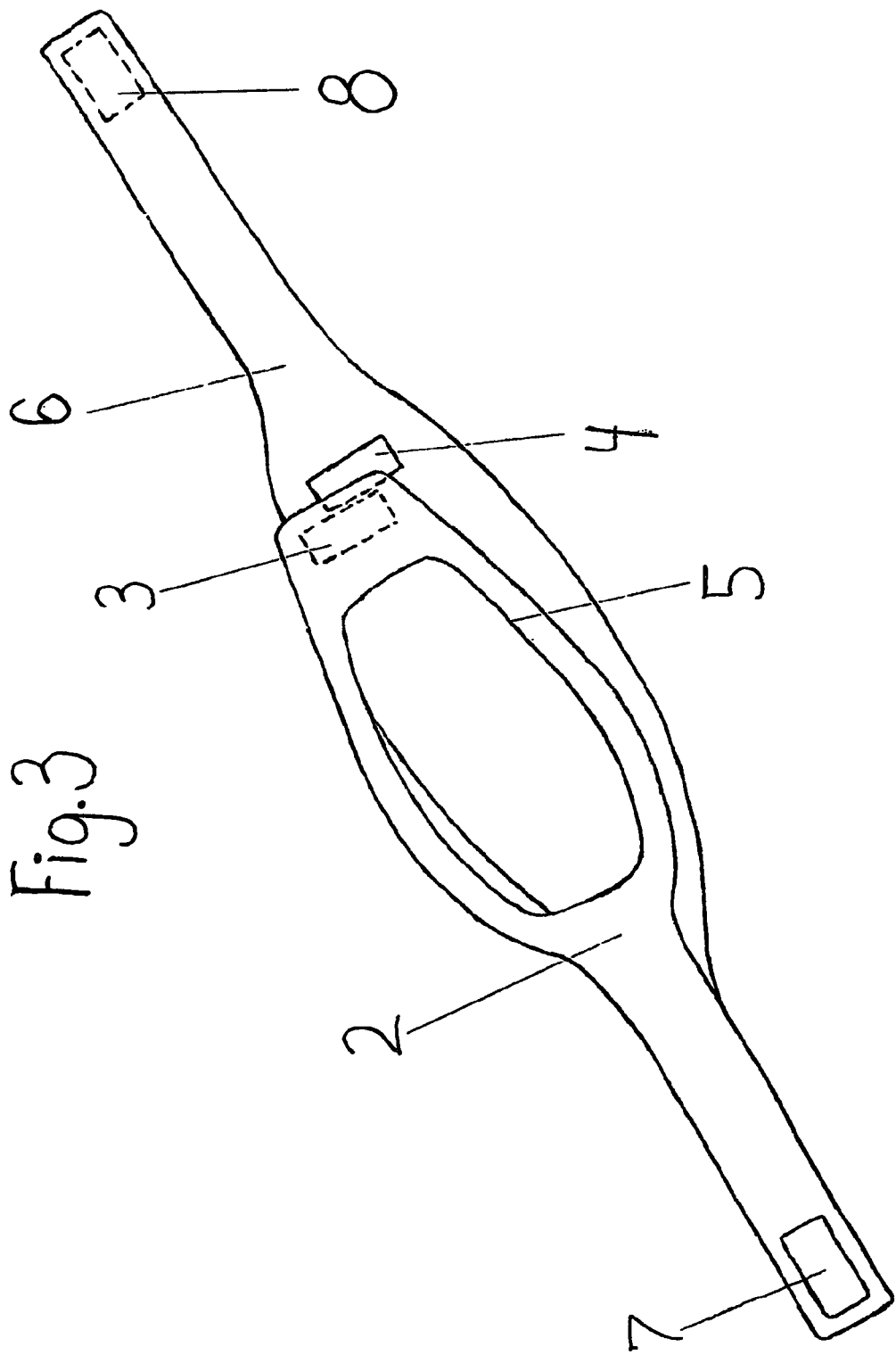
FIG. 3 is a perspective view of the patella strap of the present invention, which secures the mouse component securely to the patella section of the leg.
Figure 4:
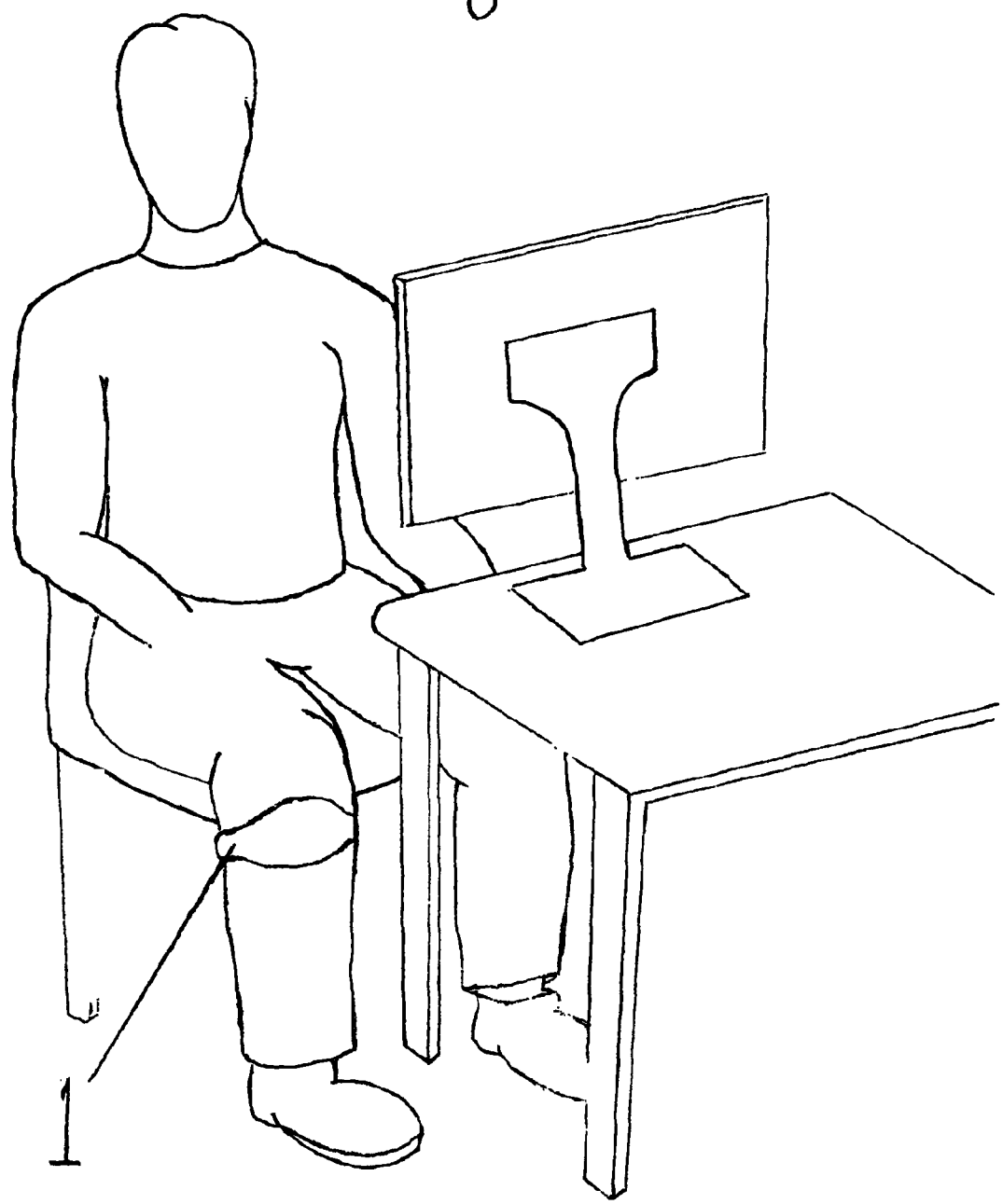
FIG. 4 is a perspective view of a computer user sitting in a chair with the patella strap securing the knee operated mouse of the present invention around the patella section of the leg.

Referring to FIGS. 1 through 4, the preferred knee operated computer mouse of the present invention is shown. As best seen in FIG. 1, the knee operated computer mouse 1 comprises a computer mouse 12, which is secured to the patella strap 6, with a mouse harness strap 2. The mouse harness strap 2, contains a mouse window 5, which comes over the top of the computer mouse 12, and sits around the perimeter to secure the computer mouse 12 to the patella strap 6 with fastening Velcro-like pieces 3 and 4. Although the size of the patella strap 6 can vary, it is designed to fasten around the patella section of the user's leg, as seen in FIG. 4, with Velcro-like sections 7 and 8. As shown in FIGS. 2a-2c, the computer mouse 12 contains a mother board 9, which is attached into the mouse's bottom shell 21. The mother board 9 is in communication with the other electrical components, such as, a left button component 10, and right button component 20, a tilting scroll wheel 24, an LED 25, an accelerometer 13, a gyroscope 11, an LED laser bottom 14, a cord connector input 23 and may include a transmitter 29, for wireless functions. A battery 26 provides electrical power for the computer mouse 12 components, and is encased in the bottom shell 21 and top shell 22. The top shell 22 contains external buttons to enable the user to specifically trigger certain functions within the computer mouse 12. The top shell 22 has a left case button holder 15, a right case button holder 28 and a tilting scroll wheel case slot 27 for accessing the tilting scroll wheel 24. A receiver 30 plugs into the universal serial bus (USB) port on a computer, to receive the signal transmitted from the computer mouse 12, when the wireless function is enabled.

As shown in FIG. 3, the patella strap 6 has an attached mouse harness strap 2, which secures the computer mouse 12 to the patella strap 6. The computer mouse 12 fits between the patella strap 6 and the mouse harness strap 2, exposing the top shell 22 of the computer mouse 12 through the mouse window 5 of the mouse harness strap 2, to allow the user to access the left case button holder 15, the right case button holder 26 and the tilting scroll wheel 24.

As shown in FIG. 4, a computer user is seated at a computer with a one piece alternate embodiment of the knee operated computer mouse 12, secured around the patella section of his or her leg.

What is claimed:

1. A computer mouse device comprising:
a body housing;
a movement tracking means for communicating movements by the mouse to the cursor on the computer screen;
a securing strap to attach to a user; and
a mouse harness strap attached to the securing strap to hold the mouse within said securing strap.

2. The device of claim 1 further comprising programmable software to enable the user to display and control the functionality of the mouse as well as to allow execution of commands via keyboard or other hands free or appendage attached push button, motion, or voice activated device.

3. The device of claim 2 further comprising a tilting scroll wheel for enabling the use of the mouse in a conventional manner such as on a desktop when removed from the securing strap.

4. The device of claim 2 wherein said movement tracking and translating means comprises a gyroscope and an accelerometer.

5. The device of claim 2 further comprising an LED, a cord connector input, a receiver, left and right mouse buttons, and a scroll wheel.

6. The device of claim 2 wherein the securing strap is secured specifically to the patella of the user's knee.

7. The device of claim 2 further comprising a connecting means.

8. The device of claim 7 wherein the connecting means is selected from the group consisting of: a wired cord, Bluetooth technology, a USB connector, infrared technology, and wireless technology.

9. The device of claim 2 wherein the securing strap and harness strap are fastened with hook and loop fasteners.

10. The device of claim 5 wherein the harness strap contains a mouse window for allowing the user to access the buttons and scroll wheel.

11. The device of claim 7 wherein the connecting means is a cord for attaching a secondary mouse for multiple cursor controls.

12. The device of claim 2 wherein the body housing contains a mouse component compartment.

13. The device of claim 12 wherein the mouse component compartment contains a renewable power source such as a battery.

14. The device of claim 2 wherein the body housing comprises a top shell and a bottom shell.

15. A computer input device comprising:
a patella strap to placed upon the leg or appendage of a computer user; and
a software programmable hands free mouse to be received within the patella strap, whereby said user can control movement of a cursor, or cursors, without moving their hand from the keyboard.

16. The device of claim 15 wherein said hands free mouse comprises a tracking means for determining direction and movement of the mouse.

17. The device of claim 16 wherein the tracking means comprises a gyroscope and an accelerometer.

18. The device of claim 17 wherein said mouse further comprises; an LED, a cord connector input, a receiver, a battery, left and right mouse buttons, and a scroll wheel.

19. The device of claim 15 wherein the patella strap is secured specifically to the patella of the user's knee.

* * * * *